(12) United States Patent
Kopietz et al.

(10) Patent No.: US 11,329,292 B2
(45) Date of Patent: May 10, 2022

(54) METHOD TO PRODUCE A COMPOSITE SEMI-FINISHED PRODUCT

(71) Applicant: Fraunhofer-Gesellschaft zur Forderung der angewandten Forschung e.V., Munich (DE)

(72) Inventors: Lukas Kopietz, Duisburg (DE); Thorsten Seipp, Dortmund (DE); Sascha Berthold, Oberhausen (DE); Jens Burfeind, Oberhausen (DE); Damian Hintemann, Stadtlohn (DE); Holger Wack, Dortmund (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 149 days.

(21) Appl. No.: 14/905,083

(22) PCT Filed: Jul. 4, 2014

(86) PCT No.: PCT/EP2014/064303
§ 371 (c)(1),
(2) Date: Jan. 14, 2016

(87) PCT Pub. No.: WO2015/007544
PCT Pub. Date: Jan. 22, 2015

(65) Prior Publication Data
US 2016/0156040 A1 Jun. 2, 2016

(30) Foreign Application Priority Data
Jul. 16, 2013 (DE) .................... 10 2013 107 514.2

(51) Int. Cl.
| | | |
|---|---|---|
| H01M 4/88 | (2006.01) | |
| H01M 8/18 | (2006.01) | |
| H01M 8/0239 | (2016.01) | |
| H01M 8/0243 | (2016.01) | |
| H01M 8/0273 | (2016.01) | |

(52) U.S. Cl.
CPC ....... H01M 4/8803 (2013.01); H01M 8/0239 (2013.01); H01M 8/0243 (2013.01); H01M 8/188 (2013.01); H01M 8/0273 (2013.01); Y02E 60/50 (2013.01)

(58) Field of Classification Search
None
See application file for complete search history.

(56) References Cited

U.S. PATENT DOCUMENTS

| | | | |
|---|---|---|---|
| 2,879,547 A * | 3/1959 | Morris | B32B 27/00 264/173.1 |
| 3,412,432 A * | 11/1968 | Fuglsang-Madsen | B29C 45/08 425/131.1 |
| 3,644,271 A | 2/1972 | Tulley | |
| 4,588,443 A * | 5/1986 | Bache | B28B 23/0081 106/644 |
| 4,778,636 A | 10/1988 | Krieg et al. | |
| 4,855,553 A | 8/1989 | Minobe | |
| 4,994,229 A * | 2/1991 | Flecknoe-Brown | B29C 51/02 264/522 |
| 6,180,275 B1 | 1/2001 | Braun et al. | |
| 2002/0058179 A1 | 5/2002 | Segit et al. | |
| 2004/0028993 A1 | 2/2004 | Jousse et al. | |
| 2004/0038116 A1 | 2/2004 | Baurens et al. | |
| 2004/0058214 A1 | 3/2004 | Mehler et al. | |
| 2004/0062977 A1 * | 4/2004 | Yazici | H01M 4/8605 429/457 |
| 2004/0119056 A1 | 6/2004 | Hofmann et al. | |
| 2007/0001333 A1 * | 1/2007 | Dias | B29C 35/0805 264/40.6 |
| 2008/0149900 A1 | 6/2008 | Jang et al. | |
| 2008/0268318 A1 | 10/2008 | Jang et al. | |
| 2009/0053490 A1 * | 2/2009 | Clausi | C08G 18/10 428/213 |
| 2010/0144980 A1 | 6/2010 | Fujibayshi et al. | |
| 2014/0213730 A1 | 7/2014 | Chernysheva et al. | |

FOREIGN PATENT DOCUMENTS

| | | |
|---|---|---|
| DE | 4018190 A1 | 12/1991 |
| DE | 4443988 A1 | 6/1996 |
| DE | 10243592 A1 | 4/2004 |
| DE | 10347701 A1 | 5/2005 |
| DE | 102008036320 A1 | 2/2010 |
| DE | 102009051434 A1 | 5/2011 |
| JP | 5695642 A | 8/1981 |
| JP | 59155007 A | 9/1984 |
| JP | 62134230 A | 6/1987 |
| JP | 62209141 A | 9/1987 |
| JP | 1112606 A | 5/1989 |
| JP | 2000223133 A | 8/2000 |
| JP | 2004505418 A | 2/2004 |
| JP | 2014521820 A | 8/2014 |
| WO | WO 9816579 * | 4/1998 |

OTHER PUBLICATIONS

Fortron PPS Short Term Properties Guide; Celanse, pp. 1-8 (Year: 2016).*

* cited by examiner

Primary Examiner — Tanisha Diggs
(74) Attorney, Agent, or Firm — The Webb Law Firm

(57) ABSTRACT

A method to produce a composite semi-finished product, having a continuous phase including at least one thermoplastic plastic and a dispersed phase made from at least one electrically conductive filler. The at least one thermoplastic plastic in form of fine particles is mixed with the at least one filler in the form of fine particles. In each case, at least 90% by weight of the particles of the at least one thermoplastic plastic and of the at least one filler are smaller than 1 mm. The mixture of the at least one thermoplastic plastic and the at least one filler is heated to a temperature greater than the melting temperature of the at least one thermoplastic plastic. The heated material is cooled to a temperature below the solidification temperature of the at least one thermoplastic plastic.

13 Claims, 2 Drawing Sheets

METHOD TO PRODUCE A COMPOSITE SEMI-FINISHED PRODUCT

CROSS-REFERENCE TO RELATED APPLICATIONS

This application is the United States national phase of International Application No. PCT/EP2014/064303 filed Jul. 4, 2014, and claims priority to German Patent Application No. 10 2013 107 514.2 filed Jul. 16, 2013, the disclosures of which are hereby incorporated in their entirety by reference.

BACKGROUND OF THE INVENTION

Field of the Invention

The invention relates to a method to produce a composite semi-finished product, having a continuous phase comprising at least one thermoplastic plastic and a dispersed phase made from at least one electrically conductive filler. Furthermore, the invention relates to a use of such a composite semi-finished product and an electrode of an electrochemical cell, produced from such a composite semi-finished product.

DESCRIPTION OF RELATED ART

Composite semi-finished products of the type referred to are in particular used to produce highly electrically conductive components. Electrodes for electrochemical cells, for example for fuel cells, redox flow batteries or similar, represent an area of application. For these and other fields of application, a high proportion of filler is desirable as in many cases the filler provides an important property of the composite semi-finished product. High thermal and/or electrical conductivities are, for example, achieved by a high proportion of graphite, which typically amounts to 70% by weight of the composite semi-finished product and more. These high proportions of filler provide some features during the production of the composite semi-finished products.

A substantial feature consists in the homogenous distribution of the filler in the matrix of the thermoplastic plastic. Extruders or kneaders are used for this, to which the plastic is supplied in the form of pellets or similar and the filler is supplied in the form of fine particles. The thermoplastic plastic is melted in the extruder or kneader and the filler is mechanically incorporated into the plastic melt. This process requires a low viscosity of the mixture such that the plastic must be heated far above the actual melting temperature.

The compound material can subsequently be brought into shape by injection moulding, for which, however, an even lower viscosity is required. The plastic must therefore be very strongly heated and subjected to a high pressure. Alternatively, the compound material can also be supplied to a calender which causes a repeated homogenisation of the compound material by repeated circulation and removal. The calendering process leads to a long dwell time of the compound material in the calender which correspondingly must be strongly heated for a long time.

Composite semi-finished products produced in a corresponding manner have only low thermoplastic properties which is disadvantageous for the further processing of the composite semi-finished products. The composite semi-finished products often have low mechanical strengths and can only be connected or thermally welded to other thermoplastics with difficulty.

Therefore an object of the present invention is to design and to further develop the method referred to at the beginning and previously described in more detail in such a way that composite semi-finished products having improved material properties can be obtained.

SUMMARY OF THE INVENTION This object is achieved by a method of the type referred to at the beginning in which the at least one thermoplastic plastic in the form of fine particles is mixed with the at least one filler in the form of fine particles, wherein in each case at least 90% by weight of the particles of the at least one thermoplastic plastic and of the at least one filler are smaller than 1 mm, in which the mixture of the at least one thermoplastic plastic and the at least of filler is heated to a temperature greater than the melting temperature of the at least one thermoplastic plastic, and in which the heated material is cooled to a temperature below the solidification temperature of the at least one thermoplastic plastic.

The invention has therefore recognised that not, as previously assumed, the particle size of the at least one filler, but in particular the particle size of the plastic and the mixture of both components before the actual processing of the materials has a considerable influence on the material properties of the composite semi-finished product. This is surprising in so far as the at least one plastic is melted independently of its original particle size in order to form a continuous phase or matrix, into which the filler is integrated. Therein the structure of the continuous phase or of the matrix depends in particular on the chain length and the chain structure of the thermoplastic plastic used, but not on the particle size thereof.

In connection with the invention, it has been recognised that the matrix structure formed by the at least one thermoplastic plastic very much depends on the original particle size of the plastic particles, and indeed indirectly. This is ascribed to the processing times and the processing temperatures in the case of the use of plastics having very small particle sizes being able to be clearly reduced according to the invention such that no or only a low number of appearances of decomposition occur with regard to the plastic or the matrix structure thereof. This is obviously due not least to the improved heat transport processes in the case of use of smaller plastic particles and the better processing ability of the previously produced, preferably substantially homogenous, mixture of plastic and filler particles. Therefore, finally a composite material is obtained, the material properties of which, despite the very high proportions of filler, are more similar to the material properties of the at least one thermoplastic plastic than this is case for the composite materials of the same composition known from the prior art, without notably effecting the material properties provided by the filler, in particular the electrical conductivity, in a disadvantageous manner. A thermoplastic composite semi-finished product can therefore preferably be obtained using the method according to the invention, said thermoplastic composite semi-finished product being able to be further processed fundamentally as a pure thermoplastic plastic or in any case in a similar manner.

For this purpose, it is particularly preferred if at least 95% by weight, in particular substantially 100% by weight of the particle distribution of the at least one thermoplastic plastic are smaller than 1 mm. Incidentally, it can be preferred for the provision of a mixture which is as homogenous as possible, before the actual processing of the same, if the maximum particle sizes of the at least one thermoplastic plastic and of the at least one filler are substantially the same. Furthermore, it can be preferred if the temperature to which the mixture of at least one thermoplastic plastic and at least one electrically conductive filler is only heated to a temperature which lies above the melting temperature but below the decomposition temperature of the at least one plastic. In the case of several thermoplastic plastics, these can be brought to a temperature above the highest melting temperature and below the lowest decomposition temperature of the thermoplastic plastics. Incidentally, the temperature of the material is subsequently lowered to a temperature which lies below the lowest solidification temperature of the thermoplastic plastics used.

In a first preferred embodiment of the method, the material of the filler has an electrical conductivity of at least 1 S/m, preferably at least $10^3$ S/m, in particular at least $10^6$ S/m. The bulk material of small filler particles can have a correspondingly lower conductivity. Therefore, a composite semi-finished product having preferred properties can be obtained. Alternatively or additionally, the electrical conductivity of the composite semi-finished product can amount to at least 1 S/m, preferably at least 100 S/m, in particular at least 1000 S/m. Fundamentally, however, it is preferred if the at least one electrically conductive filler is more electrically conductive than the at least one thermoplastic plastic, in particular all thermoplastic plastics.

The electrically conductive filler is preferably carbon, graphite, soot, titanium carbide (TiC), at least one metal and/or at least one metal compound. These fillers are particularly suitable due to their mechanical properties and their conductivity.

For example a polyolefin, in particular polyethylene (PE) and/or polypropylene (PP), polyphenylene sulphide (PPS), polyether ether ketone (PEEK), polyvinyl chloride (PVC) and/or polyamide (PA) are eligible as a thermoplastic plastic. These materials offer advantages with regard to the processing ability and the joining of the composite semi-finished product. In particular the plastics referred to can be welded easily to others.

So that the desired properties of the at least one filler determine the properties of the composite semi-finished product to a great extent, it is fundamentally preferred if the at least one filler forms a high proportion of the composite semi-finished product. As, additionally, however, the matrix structure of the at least one thermoplastic plastic substantially influences the material properties, the proportion of the at least one filler in the composite semi-finished product amounts, as required, to between 50% by weight and 95% by weight, preferably between 70% by weight and 92% by weight, in particular between 80% by weight and 90% by weight.

In order to improve the processing ability of the composite semi-finished product, it is expedient if 90% by weight of the particles of the at least one thermoplastic plastic and/or of the at least one filler are smaller than 750 μm, preferably smaller than 500 μm, in particular smaller than 300 μm. Favourable results were in particular achieved for particle sizes of approximately 150 μm. In this context it is also preferred if the predetermined particle size is fallen below by at least 95% by weight, in particular substantially 100% by weight, of the corresponding particles. Therein, however, it must be noted that, as a rule, low quantities of particles which are larger than the corresponding limit value can be well tolerated. Nevertheless, it is expedient to eliminate larger particles beforehand by sieving or another separating method.

In order to enable a quick and gentle processing, a rolling mill or a calender can be used to heat and/or cool the material. In this context, a rolling mill is understood to be an arrangement of two rollers and a calender is understood to be an arrangement of at least three rollers. For the previously described purpose, it is furthermore expedient if the rolling mill and/or the calender comprises a roller which is able to be heated and/or at least one roller which is able to be cooled.

In this context, the composite semi-finished product can be formed simply and in a manner that is gentle on the material by a transfer of the processed material from a hotter roller having a lower peripheral speed to a colder roller having a higher peripheral speed. A removal is also spoken of in this context. Additionally, a planar composite semi-finished product is thereby produced. Due to the use of the terms hotter and colder, the heat difference between the two rollers results in a qualitative without making a quantitative statement with regard to this. It is particularly preferred, however, if the hotter roller has a temperature which lies above the melting temperature of the at least one thermoplastic plastic, if necessary all thermoplastic plastics. Alternatively or additionally, the colder roller can have a temperature which lies below the solidification temperature of the at least one thermoplastic plastic, if necessary all thermoplastic plastics.

The material can, if necessary also be heated and cooled in an injection moulding system. This facilitates and accelerates, if necessary, the production of a composite semi-finished product, in particular of a composite semi-finished product having a complicated outer shape. It is therefore particularly preferred for the simplification of the processing that the heating occurs in an extruder and the cooling occurs in an injection mould.

Alternatively, the material can also be introduced into a matrix after heating and can be pressed into shape by means of a patrix. This method is also referred to as a hot pressing method. In this way, composite semi-finished products having a complicated outer shape and/or large dimensions can also be produced easily. Therein if necessary an extruder can likewise be used for heating.

In order to be able to ensure an easy further processing of the composite semi-finished product, it is also fundamentally preferred to produce a planar composite semi-finished product.

Alternatively or additionally it is preferred to produce a composite semi-finished product to produce an electrode of an electrochemical cell, preferably of a redox flow battery, of a fuel cell or of an electrolyser, of a component of a chemical-resistant heat exchanger, of a shield against high-frequency radiation, preferably in a piece of medical apparatus, of a low-friction bearing or a heating foil. In the case of these components, the mechanical properties, the high thermal conductivity and/or the high electrical conductivity can be used in a profitable manner.

The object of the invention referred to previously is additionally achieved by the use of a composite semi-finished product for the production of an electrode of an electrochemical cell, in particular of a redox flow battery, of a fuel cell or of an electrolyser, as a component of a chemical-resistant heat exchanger, as a shield against high-frequency radiation, preferably in a piece of medical apparatus, as a low-friction bearing or as a heating foil.

Likewise this object is achieved by an electrode of an electrochemical cell, in particular of a redox flow battery, of a fuel cell or of an electrolyser, as a component of a chemical-resistant heat exchanger, as a shield against high-frequency radiation, preferably in a piece of medical apparatus, as a low-friction bearing or as a heating foil.

BRIEF DESCRIPTION OF THE DRAWINGS

The invention is explained in greater detail below by means of drawings depicting only one exemplary embodiment. In the drawings are shown.

DETAILED DESCRIPTION OF THE INVENTION

Figure 1:
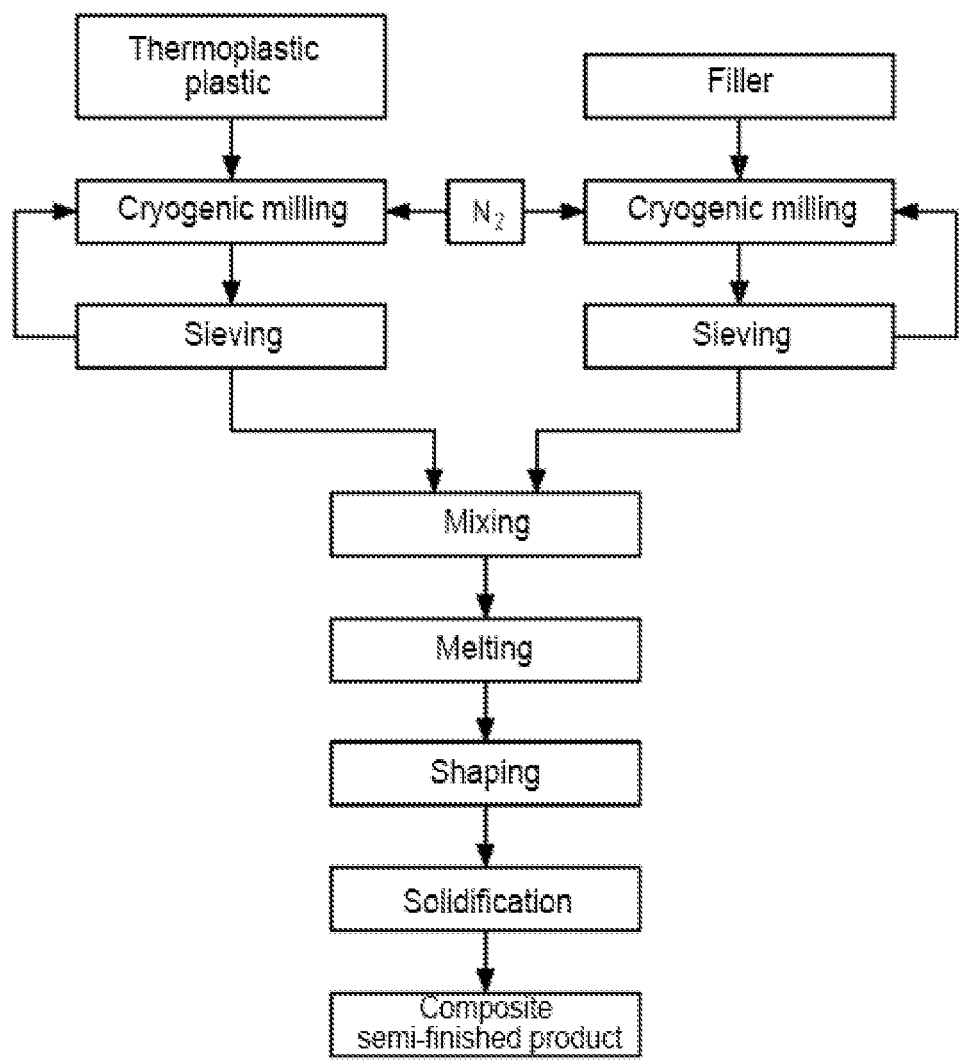
FIG. 1 the course of a method according to the invention in a schematic depiction, FIG. 2 a processing step of the method according to FIG. 1 and FIG. 3 a component, produced using the method depicted in FIG. 1.

In FIG. 1, a method to produce a composite semi-finished product 1 is depicted schematically. The composite semi-finished product 1 is formed from a mixture of a thermoplastic plastic 2 in the form of polypropylene and an electrically conductive filler 3 in the form of graphite. The thermoplastic plastic 2 is initially supplied to a cryogenic milling process in the form of coarse particles. The cryogenic milling process occurs with the addition of a refrigerant, in particular in the form of liquid nitrogen ($N_2$) in order to cool the thermoplastic plastic 2 to a temperature below at least −50° C. during the milling process, such that the brittleness of the thermoplastic plastic increases. The filler 3 is also milled with the addition of liquid nitrogen ($N_2$). The described grinding processes are referred to in FIG. 1 as "cryogenic milling". For the milling of the thermoplastic plastic 2 and of the filler 3, suitable mills are known from the prior art. The thermoplastic plastic 2 and/or the filler 3 can, however, also be milled without particular cooling or can be used entirely without previous milling.

Both the thermoplastic plastic 2 and the electrically conductive filler 3 are sieved after milling, according to the method steps referred to in FIG. 1 as "sieving". Particles larger than 150 μm are therein guided back into the milling process and are milled again. The plastic and filler particles having a size of less than 150 μm are mixed with one other as homogenously as possible. The mixers known from the prior art can be used for this. The production of the mixture 4 is referred to in FIG. 1 as a "mixing".

Figure 2:
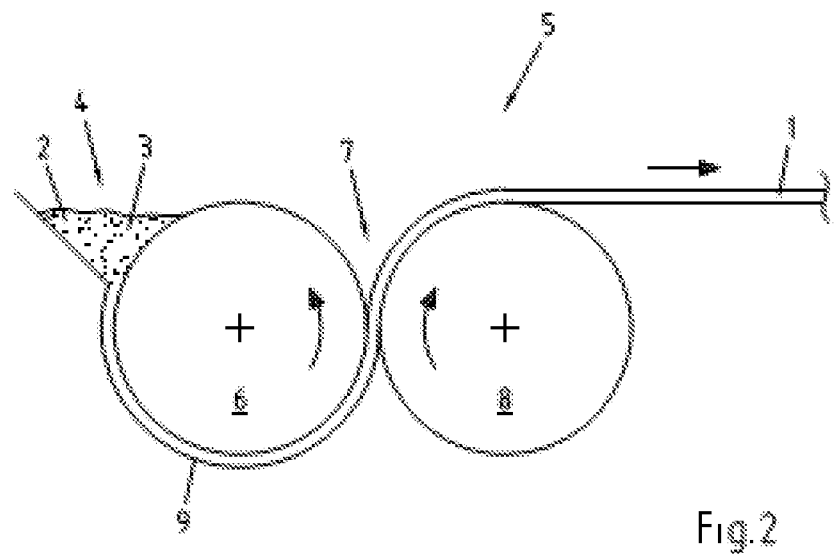

After the mixing of the thermoplastic plastic 2 and the filler 3, the mixture 4 is transferred to a rolling mill 5 depicted in FIG. 2. There, the thermoplastic plastic 2 is melted on a tempered roller 6, which corresponds to the method step "melting" according to FIG. 1. The roller temperature therein lies approximately 30° C. above the melting temperature of the thermoplastic plastic 2. The particles of the filler 3 are received in this during melting of the thermoplastic plastic 2. Therein, the thermoplastic plastic 2 forms a continuous phase in the form of a matrix for the electrically conductive filler 3 which is received in a distributed manner as a discontinuous phase, preferably homogenously, in the matrix of the thermoplastic plastic 2. The material made from the filler 3 and the melted thermoplastic plastic 2 adheres to the heated roller 6 and is therefore transported into a roller gap 7 with a further roller 8 in a rotational movement of the roller 6. This represents a substantial part of the method step "shaping" of the composite semi-finished product 1 according to FIG. 1. In the depicted and in this respect preferred method, the method step of "shaping" passes on to the method step of "solidification".

The further roller 8 is cooled such that the temperature of this roller 8 lies below the solidification temperature of the thermoplastic plastic 2 in the form of polypropylene during the processing of the material. Additionally, this roller 8 has a greater peripheral speed than the heated roller 6. Therefore, the material at least partially solidifies in the roller gap 7 and is removed from the cooled roller 8. As a consequence of the solidification of the material to form the composite semi-finished product 1, this is only partially further transported by the cooled roller 8, and indeed only until a planar composite semi-finished product 1 is removed from the cooled roller 8.

If necessary, the distance between the heated roller 6 and the cooled roller 8 can be variable. Therefore, for example, the width of the roller gap 7 can be adjustable. In particular the distance between the rollers 6, 8 can initially be selected to be so large that a layer 9 made from thermoplastic plastic 2 and electrically conductive filler 3 is initially formed to circulate on the heated roller 6, said electrically conductive filler 3 being homogenised further over time. After this layer 9 has the required thickness and/or the homogeneity, the cooled roller 8 can be driven up to the heated roller 6 in order to form the roller gap 7 and to remove the composite semi-finished product 1 as described.

Figure 3:
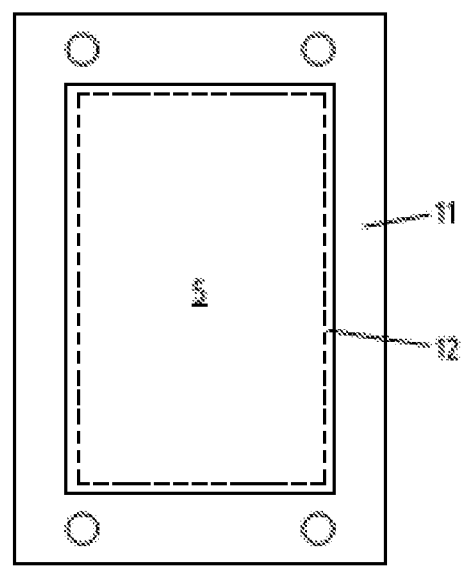

As a consequence of the very short processing duration and low temperatures in comparison to the prior art, a composite semi-finished product 1 is obtained which, despite the high proportion of filler in the composite semi-finished product 1 of presently 85% by weight, has considerable thermoplastic properties. This is used in the component depicted in FIG. 3 in the form of an electrode 10 for an electrochemical cell by the electrode 10 being welded in a circulating manner to its edges 11 with a cell frame element 12 of the electrochemical cell.

The invention claimed is:

1. A method to produce a composite semi-finished product, having a continuous phase comprising at least one thermoplastic polymer [plastic] and a dispersed phase made from at least one electrically conductive filler comprising the steps of:
    mixing the at least one thermoplastic polymer [plastic] in the form of fine particles with the at least one filler comprising carbon in the form of fine particles to form a mixture, wherein in each case at least 90% by weight of the particles of the at least one thermoplastic polymer [plastic] and of the at least one filler are smaller than 300 μm before mixing,
    heating the mixture of the at least one thermoplastic polymer [plastic] and the at least one filler to a temperature greater than the melting temperature of the at least one thermoplastic polymer [plastic] to form a material made from the at least one filler and the melted at least one thermoplastic polymer [plastic],
    cooling the material to a temperature below the solidification temperature of the at least one thermoplastic polymer [plastic], and
    using a rolling mill and/or a calender comprising at least one roller which is able to be heated and/or cooled to heat and/or cool the mixture and/or material, wherein the composite semi-finished product is formed by transfer of the material from a hotter roller having a roller temperature above a melting temperature of the at least one thermoplastic polymer [plastic] and having a lower peripheral speed to a colder roller having a roller temperature below a solidification temperature of the at least one thermoplastic polymer [plastic] and having a higher peripheral speed,
    wherein the hotter roller and the colder roller are arranged parallel to each other to form a common gap therebetween, wherein the material is at least partially solidified in the common gap and is removed from the colder roller,
    wherein the material is transferred from the hotter roller to the colder roller by the material adhering to the hotter roller and being transported to the common gap with the colder roller in a rotational movement of the hotter roller, wherein the at least one filler is used in a proportion between 70% by weight and 92% by weight, with regard to the composite semi-finished product, wherein the balance of the mass is the thermoplastic polymer.

2. The method according to claim 1, wherein the material of the at least one electrically conductive filler has an electrical conductivity of at least 1 S/m.

3. The method according to claim 1, wherein [carbon,] graphite, soot, and/or titanium carbide (TiC)[, at least one metal and/or at least one metal compound] is used as [an] the electrically conductive filler.

4. The method according to claim 1, wherein polyethylene (PE), polypropylene (PP), polyphenylene sulphide (PPS), polyether ether ketone (PEEK), polyvinyl chloride (PVC) and/or polyamide (PA) is used as a thermoplastic polymer.

5. The method according to claim 1, wherein the material is heated and cooled in an injection moulding system.

6. The method according to claim 1, wherein the material is introduced into a matrix after heating and is pressed into shape by means of a patrix.

7. The method according to claim 1, wherein a planar composite semi-finished product is produced.

8. The method according to claim 1, wherein the composite semi-finished product for the production of an electrode of an electrochemical cell, of a fuel cell or of an electrolyser, of a component of a chemical-resistant heat exchanger, of a shield against high-frequency radiation, of a low-friction bearing or of a heating foil is produced.

9. The method according to claim 1, wherein the material of the at least one electrically conducive filler has an electrical conductivity of at least $10^3$ S/m.

10. The method according to claim 1, wherein the material of the at least one electrically conductive filler has an electrical conductivity of at least $10^6$ S/m.

11. The method according to claim 5, wherein the heating occurs in an extruder and the cooling occurs in an injection mould.

12. The method according to claim 1, wherein at least 90% by weight of the particles of the at least one thermoplastic polymer [plastic] and of the at least one filler are smaller than 150 µm before mixing.

13. The method of claim 1, wherein the electrically conductive filler further comprises at least one metal and/or at least one metal compound.

* * * * *

UNITED STATES PATENT AND TRADEMARK OFFICE
CERTIFICATE OF CORRECTION

PATENT NO. : 11,329,292 B2
APPLICATION NO. : 14/905083
DATED : May 10, 2022
INVENTOR(S) : Lukas Kopietz et al.

It is certified that error appears in the above-identified patent and that said Letters Patent is hereby corrected as shown below:

On the Title Page

Column 2, item (56) Other Publications, Line 1, delete "Celanse," and insert -- Celanese, --

In the Claims

Column 6, Line 31, Claim 1, after "polymer" delete "[plastic]"

Column 6, Line 34, Claim 1, after "polymer" delete "[plastic]"

Column 6, Line 39, Claim 1, before "and" delete "[plastic]"

Column 6, Line 42, Claim 1, after "polymer" delete "[plastic]"

Column 6, Line 44, Claim 1, after "polymer" delete "[plastic]"

Column 6, Line 46, Claim 1, delete "polymer [plastic]," and insert -- polymer, --

Column 6, Line 49, Claim 1, delete "polymer [plastic]," and insert -- polymer, --

Column 6, Line 56, Claim 1, after "polymer" delete "[plastic]"

Column 6, Line 59, Claim 1, after "polymer" delete "[plastic]"

Column 7, Line 11, Claim 3, after "wherein" delete "[carbon,]"

Column 7, Lines 12-13, Claim 3, delete "(TiC)[, at least one metal and/or at least one metal compound]" and insert -- (TiC) --

Signed and Sealed this
Ninth Day of August, 2022

Katherine Kelly Vidal
*Director of the United States Patent and Trademark Office*

Column 7, Line 13, Claim 3, after "as" delete "[an]"

Column 8, Line 19, Claim 12, after "polymer" delete "[plastic]"